UNITED STATES PATENT OFFICE 2,688,544

SILVER HALIDE PHOTOGRAPHIC EMULSION CONTAINING DIALKYL 5-(CARBOXY FATTY ACID AMIDO) ISOPHTHALATES

Fred C. McCrossen, Ilmari F. Salminen, and Arnold Weissberger, Rochester, N. Y., assignors to Eastman Kodak Company, Rochester, N. Y., a corporation of New Jersey No Drawing. Application July 31, 1952, Serial No. 301,961

3 Claims. (Cl. 95—6)

This invention relates to dialkyl 5-(carboxy fatty acid amido) isophthalates and to a method for preparing them.

In the preparation of couplers for color photography, especially couplers having an active methylene or phenolic hydroxyl group, which react with the oxidation product of primary aromatic amino developing agents to form an azomethine or indoaniline dye, it is frequently desirable to introduce an isophthalic acid or isophthalic ester group into the coupler as an aid in solubilizing it. A dialkyl 5-aminoisophthalate, for example, dimethyl 5-aminoisophthalate is a useful intermediate for this purpose but its use is limited because it can be condensed only with those coupler intermediates which contain ester, acid chloride, anhydride or similar acidic functions. Many coupler intermediates are aminic in nature, that is, contain a primary or secondary amino group which is unreactive with the dialkyl 5-aminoisophthalate.

It is therefore an object of our invention to provide a method for treating a dialkyl 5-aminoisophthalate so that it can be readily condensed with coupler intermediates or other compounds containing amino groups. A further object is to provide a method for the formation of a dialkyl 5-(carboxy fatty acid amido) isophthalate which is useful for this purpose as described below. Other objects will appear from the following description of our invention.

These objects are accomplished in general by treating a dialkyl 5-aminoisophthalate with a dibasic acid anhydride containing from 1 to 5 alkane groups. This reaction is illustrated by the following equation:

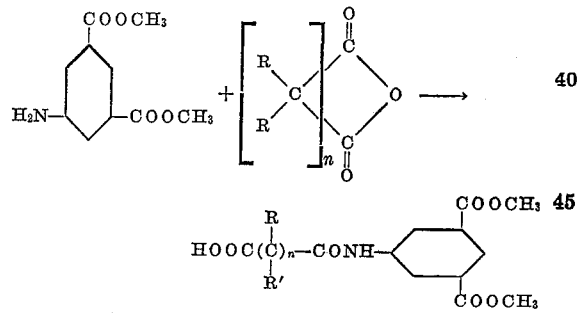

where R and R' are hydrogen, alkyl, aryl, aralkyl; R and R' may be the same or different; n has a value of 1 to 5.

The dibasic acid anhydrides which can be used in this reaction include malonic anhydride, succinic anhydride, glutaric anhydride, adipic anhydride and pimelic anhydride, or a substituted dibasic anhydride such as α-methyl glutaric anhydride.

Since it is our interest that the isophthalate resulting from this reaction be used in the synthesis of couplers, we may further treat the dialkyl 5-(carboxy fatty acid amido) isophthalate with thionyl chloride or other suitable reagent to form a carboxylic acid chloride which can then be reacted with the aminic coupler as illustrated in the following equations:

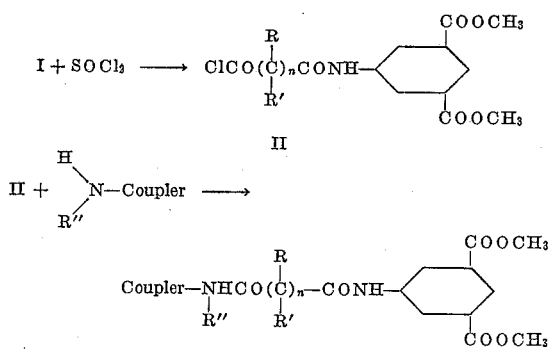

where R, R' and R'' are hydrogen, alkyl, aryl, aralkyl.

The following example illustrates the reaction of dimethyl 5-aminoisophthalate with a dibasic acid anhydride according to our invention:

*3,5-dicarbomethoxyphenylcarbamylvaleric acid*

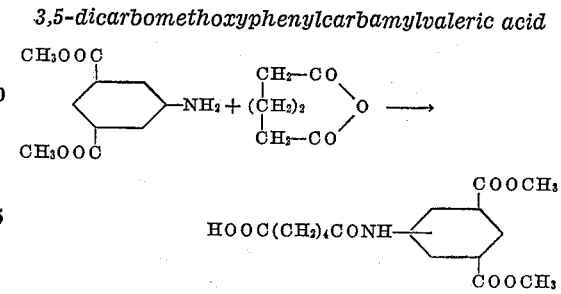

In a 12-liter flask equipped with a condenser and dropping funnel were placed 3.5 liters of dry benzene and 160 g. (0.766 mole) of dimethyl 5-amino isophthalate. The benzene was heated to boiling and a solution of 98 g. (0.766 mole) of adipic anhydride dissolved in 875 cc. of dry benzene was added rapidly. Refluxing was continued an additional ten minutes and the re-

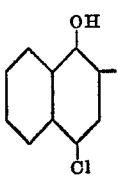

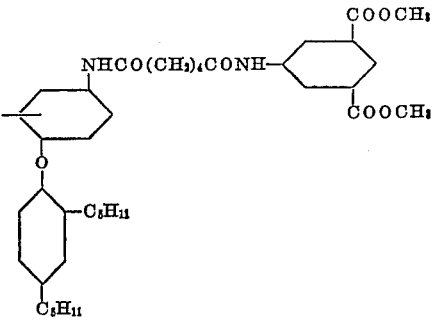

action allowed to cool. The solid was filtered and washed with a small volume of cold dry benzene, followed by cold dry petroleum ether, and dried. On recrystallization from 300 cc. of methyl alcohol 162 g. were obtained (62.5% of the theoretical amount): M. P. 178–180° C.

The following couplers were produced by treatment of the aminic coupler intermediate with the dimethyl 5-(chlorocarbonyl fatty acid amido) isophthalate according to our invention:

1. 6-{2'-(2'',4''-di - tert. - amylphenoxy) - 5'-[ω-(3'',5'' - dicarbomethoxy - phenylcarbamyl)-valeramido]benzamido}-2,4-dichloro - 3 - methylphenol:

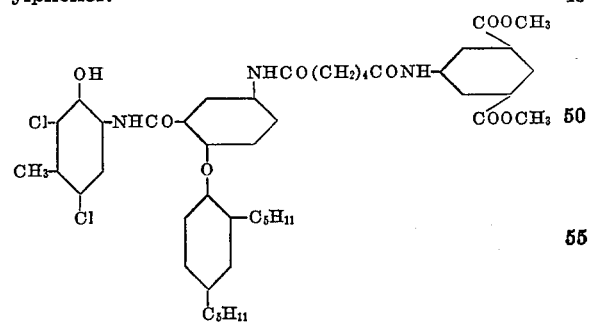

2. α-2' - methoxybenzoyl - 4 - [2'' - (3''',5'''-dicarbomethoxyphenylcarbamyl - valeramido)-5'' - (2'''',4'''' - di - tert. - amylphenoxy)benzamido]-acetanilide:

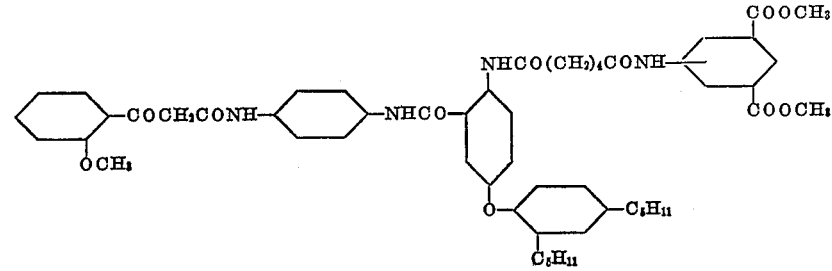

3. 1-hydroxy-4-chloro-N - {4 - [2' - (2''',4'''-di-tert. - amylphenoxy) - 5' - (3'''',5'''' - dicarbomethoxyphenylcarbamylvaleramido ) benzamido] - phenethyl}-2-naphthamide:

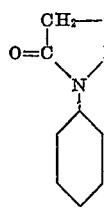

4. 1-phenyl-3-{3'-[2''-(2''',4'''-di-tert. - amylphenoxy) - 5'' - (3'''',5'''' - dicarbomethoxyphenylcarbamylvaleramido)benzamido] - benzamido}-5-pyrazolone:

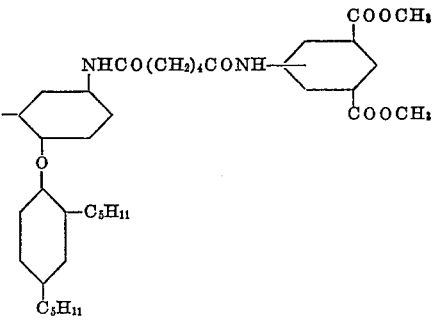

The preparation of a typical coupler, Compound 1, is illustrated by the following example:

*3,5-dicarbomethoxyphenylcarbamylvaleryl chloride*

In a 12-liter flask equipped with a condenser and drying tube were placed 337 g. (1.0 mole) of 3,5-dicarbomethoxyphenylcarbamylvaleric acid and 1189 g. (10 moles) of thionyl chloride. The mixture was allowed to stand overnight. The excess thionyl chloride was removed at a water pump, and the residual thionyl chloride removed by the addition of two portions of 200 cc. each of dry benzene and evacuation with a water pump. The solid residue was crystallized from 800 cc. of dry benzene, and the solid filtered, washed with a small volume of dry benzene, and dried at room temperature; M. P. 100–102°. The yield was 240 g. (67.5% of the theoretical quantity).

6-{2'-(2'',4''-di - tert. - amylphenoxy) - 5'[ω-(3'',5'' - dicarbomethoxyphenylcarbamyl)valerylamido]benzamido} - 2,4 - dichloro - 3 - methylphenol:

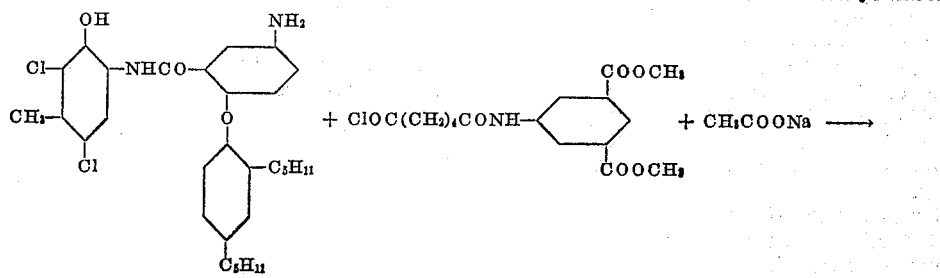

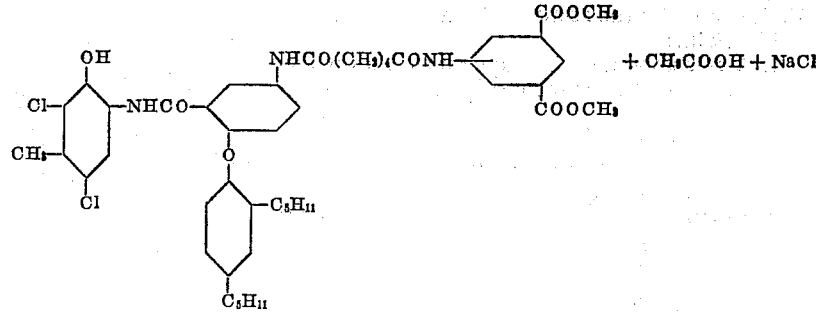

In a 12-liter flask, equipped with a stirrer, were placed 1150 cc. of glacial acetic acid and 16.5 g. (0.25 mole) of anhydrous sodium acetate; the mixture was stirred until solution occurred. One hundred twenty-five grams (0.23 mole) of the coupler amine was added with rapid stirring. After ten minutes 88.6 g. (0.25 mole) of 3,5-dicarbomethoxyphenylcarbamylvaleryl chloride was added and stirring continued overnight. Nineteeth hundred cc. of methyl alcohol was added to the turbid mixture, followed by the slow addition of 915 cc. of distilled water over a period of one and one-half hours. Stirring was discontinued and the solid allowed to settle. The solid was filtered and washed with 50% acetic acid, distilled water, and dried. The crude product melts at 180–184° C. On recrystallization from ethyl alcohol, 172 g. was obtained (80% of the theoretical amount); M. P. 188–190° C.

The coupler amine used in the above preparation was prepared as follows:

*2,4 - dichloro - 3 - methyl - 6 - [3' - nitro - 6'-(2'',4''-di - tert. - amylphenoxy) - benzamido]-phenol.*—In a 5-l., 3-necked flask provided with a stirrer and a thermometer was placed 1380 cc. of acetic acid. To it were added 138 g. (1.64 moles) of anhydrous sodium acetate, 138 g. (0.6 mole) of 2-amino-4,6-dichloro-5-methyl phenol hydrochloride and 264 g. (0.63 mole) of 2-(2',4'-di-tert.-amylphenoxy)-5-nitrobenzoyl chloride. The heat of reaction raised the temperature about 8° C. The slurry was stirred vigorously for 1 hr. At no time did the solid go completely into solution. The slurry was then washed into a 12-l. flask with 7.5 l. of water and the aqueous solution filtered on a 37-cm. Lapp table-top funnel. The product was washed on the funnel with 9 l. of ethyl alcohol and dried. The yield was 356 g. (102%); M. P. 194–197° C. The product was then recrystallized from 9 l. of 97% acetic acid, filtered through the table-top funnel, washed on the funnel with 900 cc. of acetic acid and two 1800-cc. portions of petroleum ether. The product was air dried. The yield was 302 g. (84%); M. P. 205–207° C.

*2,4-dichloro - 3 - methyl - 6 - [3' - amino - 6'-(2'',4''-diamylphenoxy)-benzamido] - phenol.*—In a 12-l. flask equipped with a stirrer and reflux condenser were placed 3 l. of 90% acetic acid and 1.5 l. of ethyl alcohol; 300 g. (0.52 mole) of 2,4-dichloro-3-methyl-6-[3'-nitro-6'-(2'',4''-di - tert. - amylphenoxy) - benzamido]-phenol was added to the acid-alcohol solution with stirring to prevent cake formation. This compound did not go into solution completely even under reflux conditions. The flask and its contents were heated to boiling over a gas ring. When reflux conditions were reached the flame was extinguished and 300 g. (5.4 moles) of powdered iron metal added all at once. The reaction was quite vigorous. The reflux condenser was replaced immediately after the iron addition. The solution was refluxed for 10 min. The hot solution was filtered rapidly with vacuum through a 12-in. Büchner funnel into a 22-l. flask to remove the excess iron and iron oxides formed. To the filtrate was added with stirring 8–9 l. of water. The amine was precipitated out and filtered off on a 37-cm. Lapp table-top funnel and washed on the funnel with 4–5 l. of water. The product was sucked as dry as possible and dissolved in 3 l. of ethyl ether. Residual water was removed in a large separatory funnel and the ether solution dried over 300 g. of Drierite. The ether solution was concentrated to dryness under reduced pressure and the crude amine which results was dissolved in 1.2 l. of hot toluene and to this solution was added 4.2 l. of warm ligroin. The solution was then set aside to crystallize. When crystallization appeared complete the solid was filtered off on a 12-in. Büchner funnel, washed with 1 l. of petroleum ether and dried. The yield was 163 g. (58%); M. P. 174–176° C.

Compounds 2 to 4 were prepared similarly to Compound 1, using the appropriate coupler amine in each case.

The couplers produced according to our invention may be incorporated directly in a gelatino-silver halide emulsion by hydrolysis of the ester and incorporation as described in the following example:

Three grams of Compound 1 were dissolved in a mixture of 15 cc. of 95 per cent ethyl alcohol and 7.5 cc. of 20 per cent sodium hydroxide solution. The mixture was warmed gently if necessary to complete solution of the coupler and then poured into 200 cc. of water at 40° C. If desired, the mixture may be added directly to a gelatin solution. The resulting solution was brought to a pH of 6 to 7 by addition of 2 per cent citric acid solution. The coupler solution was then mixed with a suitable amount of melted silver halide emulsion e. g. 400 cc. of a positive type gelatino-silver halide emulsion at 40° C. After coating, the emulsion layer thus obtained was subjected to the usual exposure and processing steps of color photography.

It will be understood that the examples and modifications set forth herein are illustrative only and that our invention is to be taken as limited only by the scope of the appended claims.

We claim:

1. A gelatino-silver halide emulsion layer containing a coupler compound having the formula

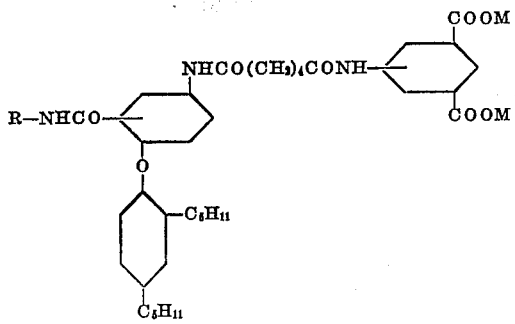

where R represents an enolic group capable of coupling with the oxidation product of a primary aromatic amino developing agent, and M represents an alkali metal.

2. A gelatino-silver halide emulsion layer containing a coupler compound having the formula

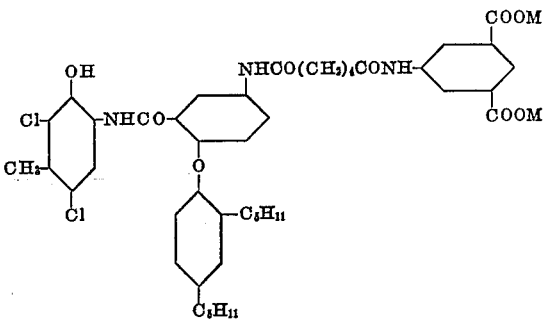

where M represents an alkali metal.

3. A gelatino-silver halide emulsion layer containing a coupler compound having the formula

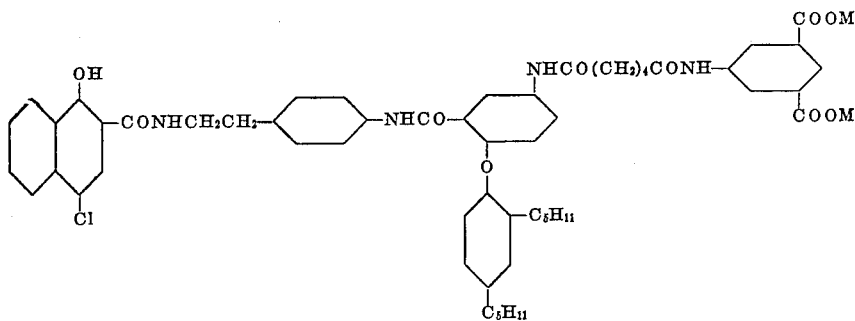

where M represents an alkali metal.

References Cited in the file of this patent

UNITED STATES PATENTS

| Number | Name | Date |
| --- | --- | --- |
| 2,161,552 | Vanderbilt | June 6, 1939 |
| 2,166,934 | Tuttle | July 25, 1939 |
| 2,356,475 | Schinzel | Aug. 22, 1944 |
| 2,369,929 | Vittum | Feb. 20, 1945 |
| 2,397,452 | White | Mar. 26, 1946 |